March 25, 1941. J. C. WATTLEWORTH 2,236,047
APPARATUS FOR MACHINING OPPOSED ENDS OF A WORKPIECE
Filed March 4, 1940 7 Sheets-Sheet 1

INVENTOR.
JOHN C. WATTLEWORTH
BY
Richey & Watts
ATTORNEYS.

March 25, 1941.   J. C. WATTLEWORTH   2,236,047
APPARATUS FOR MACHINING OPPOSED ENDS OF A WORKPIECE
Filed March 4, 1940   7 Sheets-Sheet 2
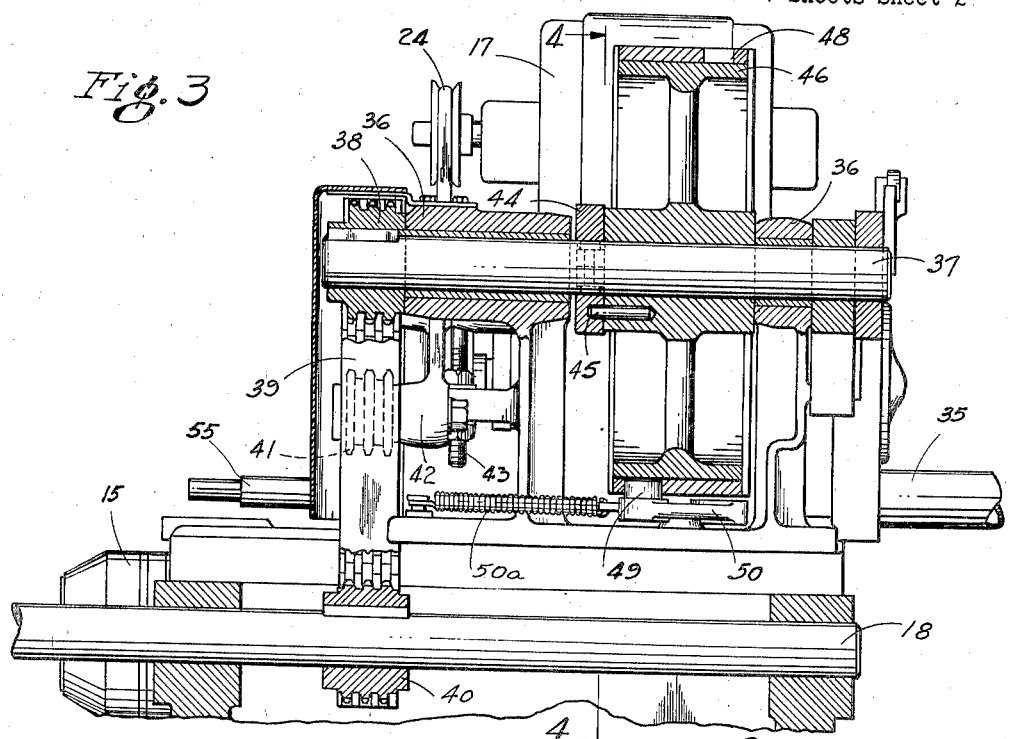
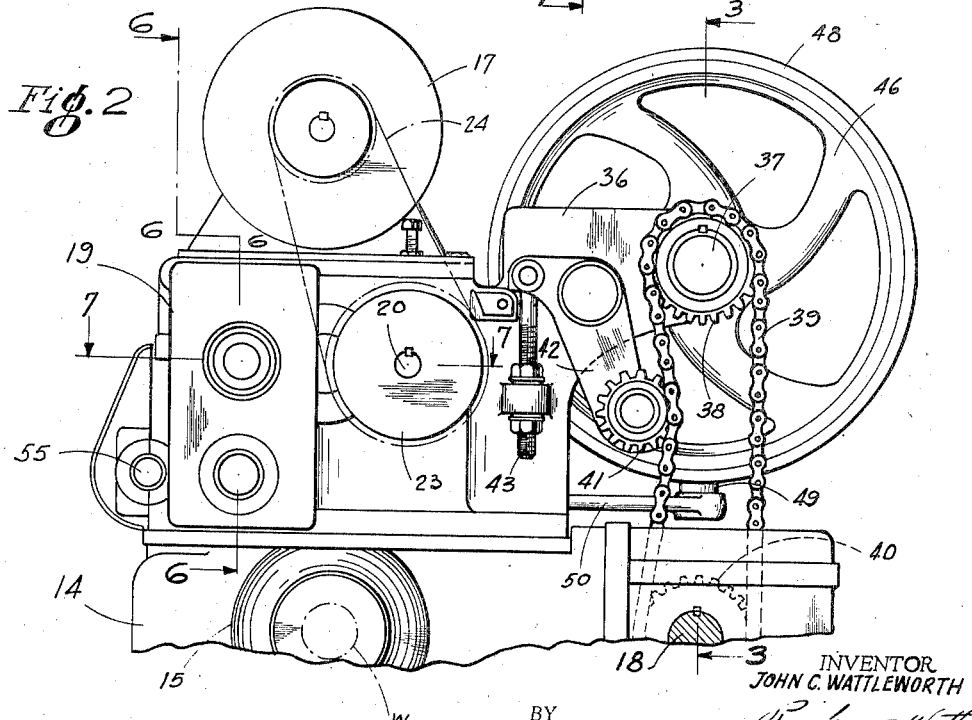
INVENTOR
JOHN C. WATTLEWORTH
BY
ATTORNEYS.

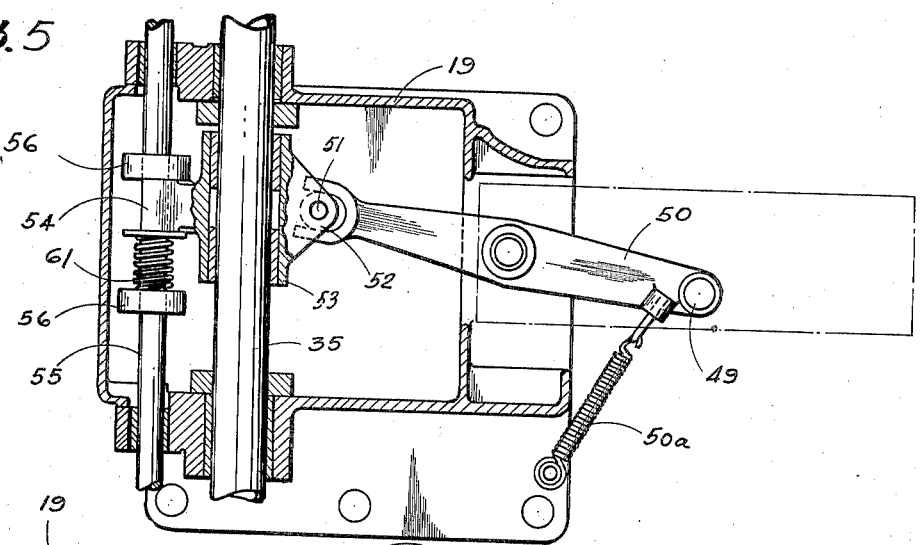
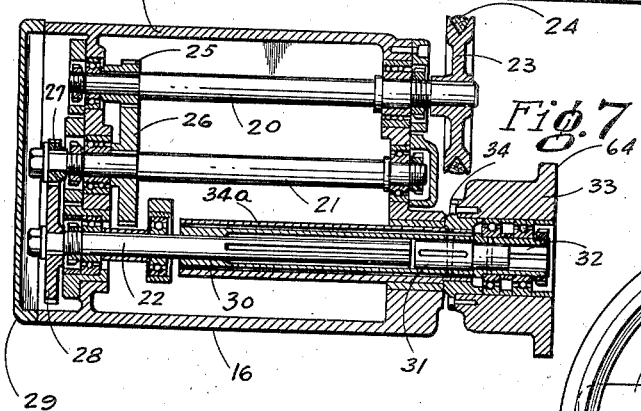
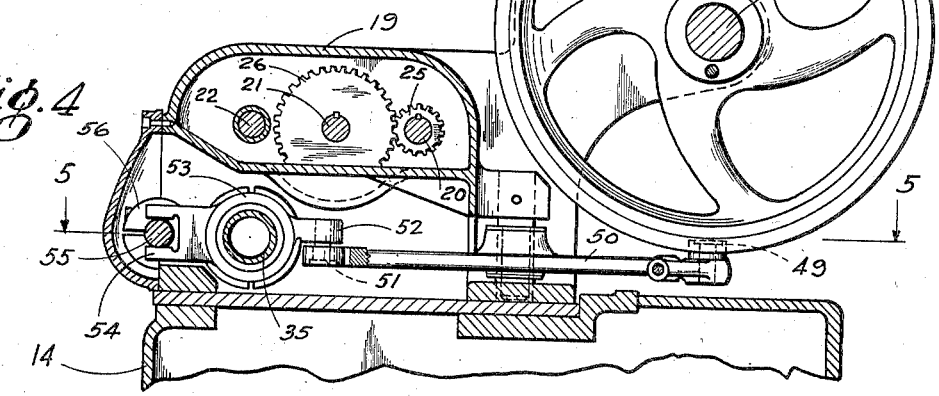

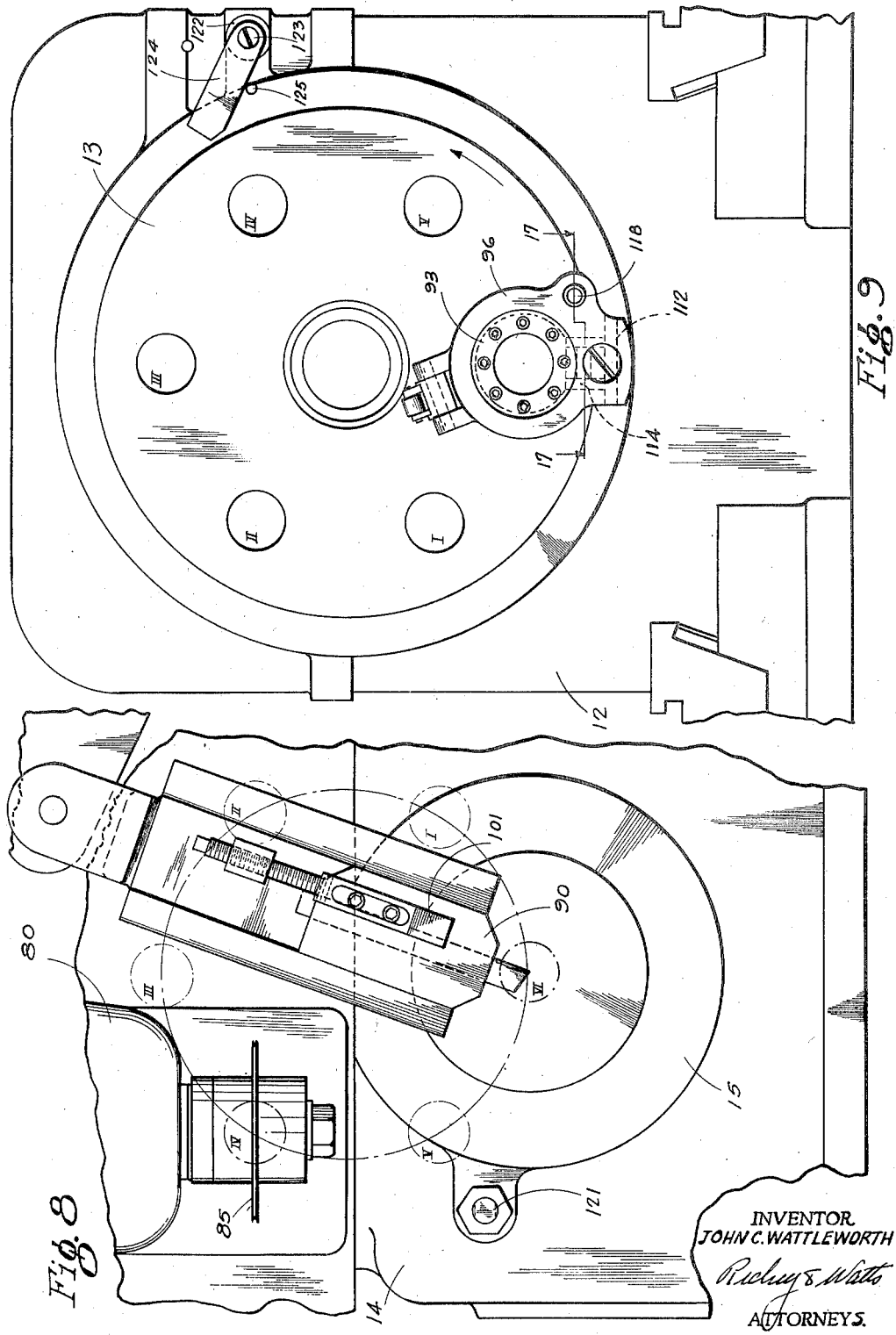

March 25, 1941.  J. C. WATTLEWORTH  2,236,047
APPARATUS FOR MACHINING OPPOSED ENDS OF A WORKPIECE
Filed March 4, 1940   7 Sheets-Sheet 6
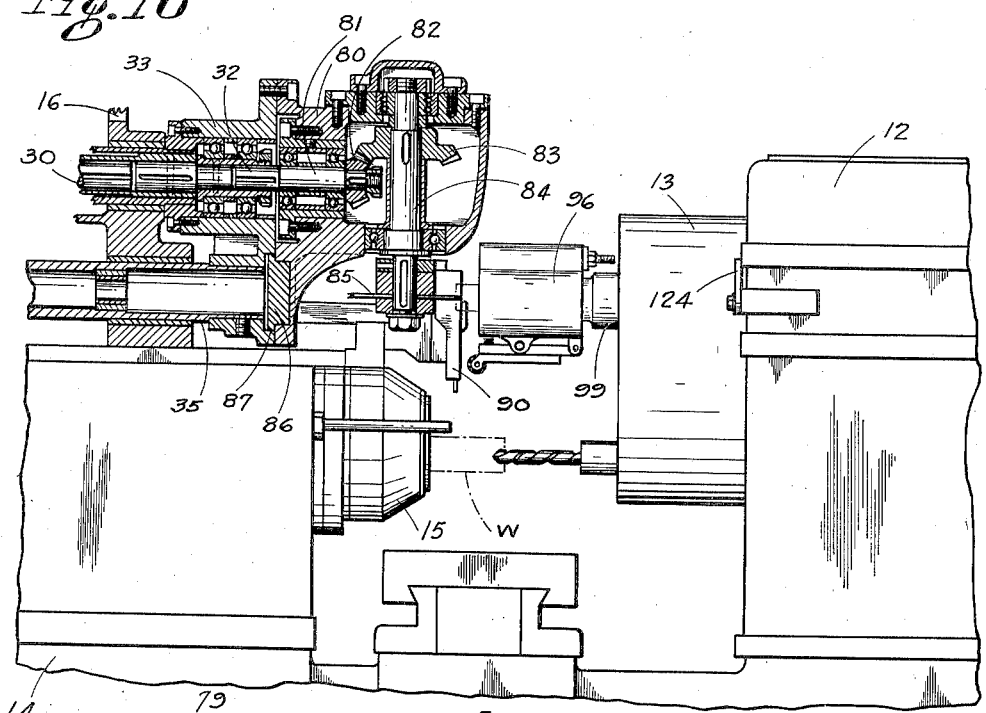
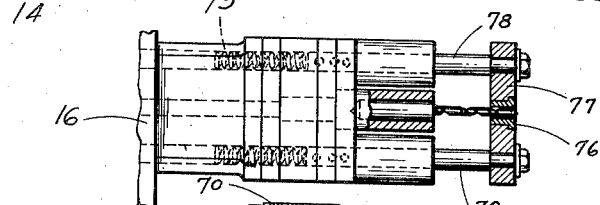
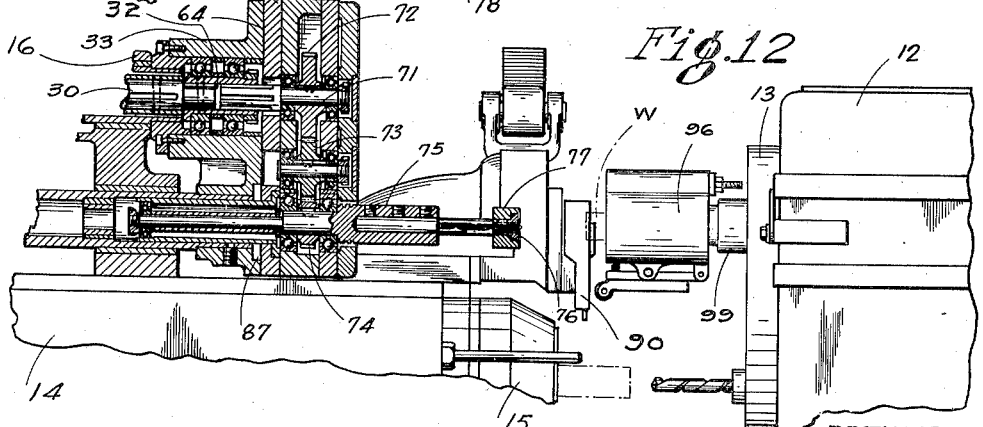
INVENTOR
JOHN C. WATTLEWORTH
BY
ATTORNEYS.

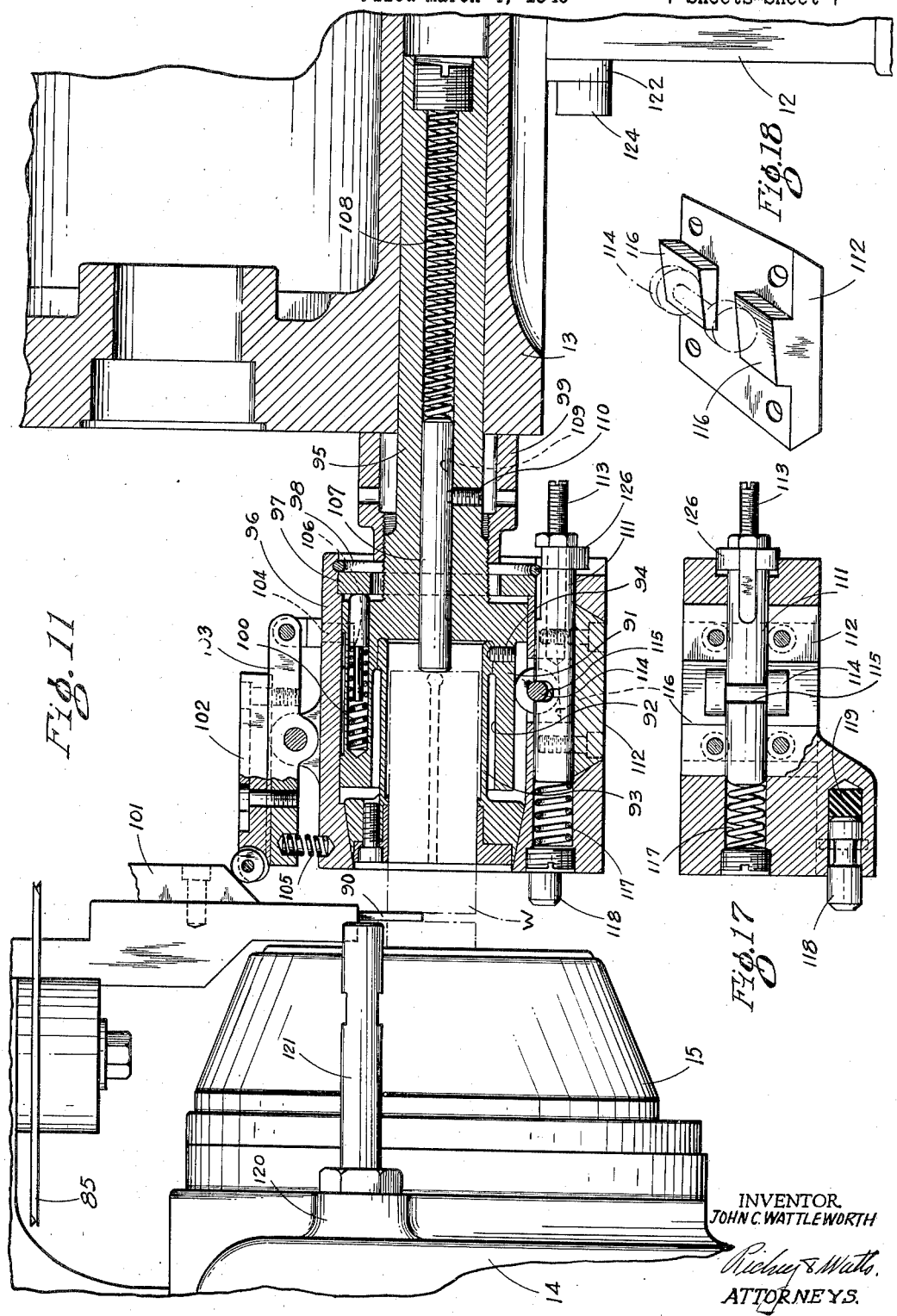

Patented Mar. 25, 1941

2,236,047

UNITED STATES PATENT OFFICE 2,236,047

APPARATUS FOR MACHINING OPPOSED ENDS OF A WORKPIECE

John C. Wattleworth, Cleveland, Ohio, assignor to The Cleveland Automatic Machine Company, Cleveland, Ohio, a corporation of Ohio Application March 4, 1940, Serial No. 322,190

18 Claims. (Cl. 29—43)

This invention relates broadly to single spindle screw machines and more specifically to mechanism therefor which is adapted to effect the automatic transposition of a workpiece from the chucking collet to a holder where secondary operations may be performed upon the opposed end thereof in sequential order of operation.

One of the objects of the invention is to provide an organization of screw machine attachments including a workpiece holder which is adapted to grip the work coincident the operation of the cut-off tool, transfer the workpiece within the indexed cycle of the turret to an operative position in relation to another of said attachments where secondary operations are performed upon the end portion thereof.

Another object of the invention is to provide an attachment embodying an independent power drive unit which is adapted to support various types of tools and effect the automatic operation thereof in timed relation with the turret and cutting tool actuating mechanism.

Another object of the invention is to provide mechanism for feeding and reciprocating a rotatively driven tool towards and away from the tool turret and in time relation therewith.

Another object of the invention is to provide a tool turret transfer mechanism which is adapted to engage a workpiece during the period in which the cut-off tool is in operation and contemporaneously tighten the chucking device carried by the transfer mechanism so that a secondary machine operation may be performed in the workpiece, then subsequent the secondary machine operation cause the automatic ejection of the workpiece from the transfer mechanism.

Other objects and advantages more or less ancillary to the foregoing and the manner in which all the various objects are realized will appear in the following description wherever there is assembled and pointed out certain combination of parts and specific constructions indicative of the scope and spirit of the invention.

Referring to the drawings which illustrate the preferred embodiment of the invention, Fig. 1 is a front elevational view of a single spindle screw machine embodying the improved attachments in operative position thereon;

Fig. 2 is an end elevational view of one of the attachments illustrated in Fig. 1, including a fragmentary portion of the screw machine, the illustration being arranged as viewed from a plane indicated by the line 2—2 in Fig. 1;

Fig. 3 is a vertical sectional view through a portion of the attachment illustrated in Fig. 2, the section being taken on the plane indicated by the line 3—3 in Fig. 2;

Fig. 4 is a vertical sectional view through another portion of the attachment illustrated in Figs. 2 and 3, the section being taken on a plane indicated by the line 4—4 in Fig. 3;

Fig. 5 is a horizontal sectional view of the attachment shown in Fig. 4, the illustration being viewed as taken on a plane indicated by the line 5—5 in Fig. 4;

Fig. 7 is a transverse sectional view through the attachment illustrated in Fig. 2, the section being taken on the plane indicated by the line 7—7 in Fig. 2;

Fig. 8 is an end elevational view of a fragmentary portion of the screw machine illustrated in Fig. 1, showing the attachment as viewed from a plane indicated by the line 8—8 in Fig. 1;

Fig. 9 is an end elevational view of a fragmentary portion of the screw machine illustrated in Fig. 1, including the attachment, as viewed from a plane indicated by the line 9—9 in Fig. 1;

Fig. 10 is an enlarged fragmentary view of a portion of the screw machine illustrated in Fig. 1, including a vertical sectional view taken through the attachment which, in the instant case, is illustrated as having a saw mounted thereon for cutting slots and similar operations in the end portion of the work;

Fig. 11 is a fragmentary portion of the screw machine and the workpiece transfer mechanism, the latter and a portion of the tool turret being shown in section in order to illustrate, with greater clarity, the structural detail thereof;

Fig. 12 is a fragmentary portion of the screw machine and the attachment as adapted for use in high speed drilling, the attachment being shown in vertical section;

Fig. 13 is a plan view of the high speed drilling attachment, portions of the drill support being broken away to illustrate, with greater clarity the construction of the drill supporting mechanism;

Fig. 17 is a transverse sectional view taken on a plane indicated by the line 17—17 in Fig. 9; and Fig. 18 is a view in perspective of the cam block 112.

Figure 1:
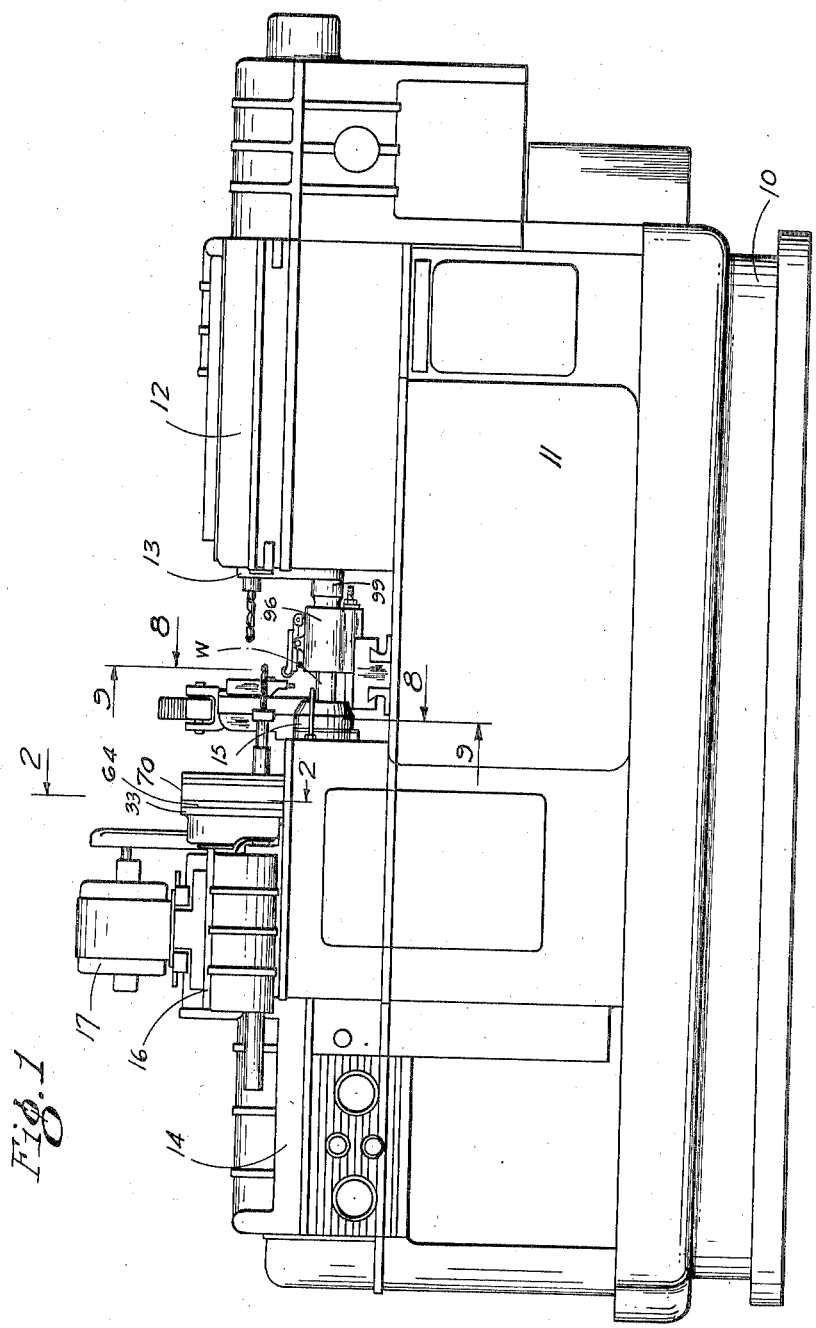
Figure 6:
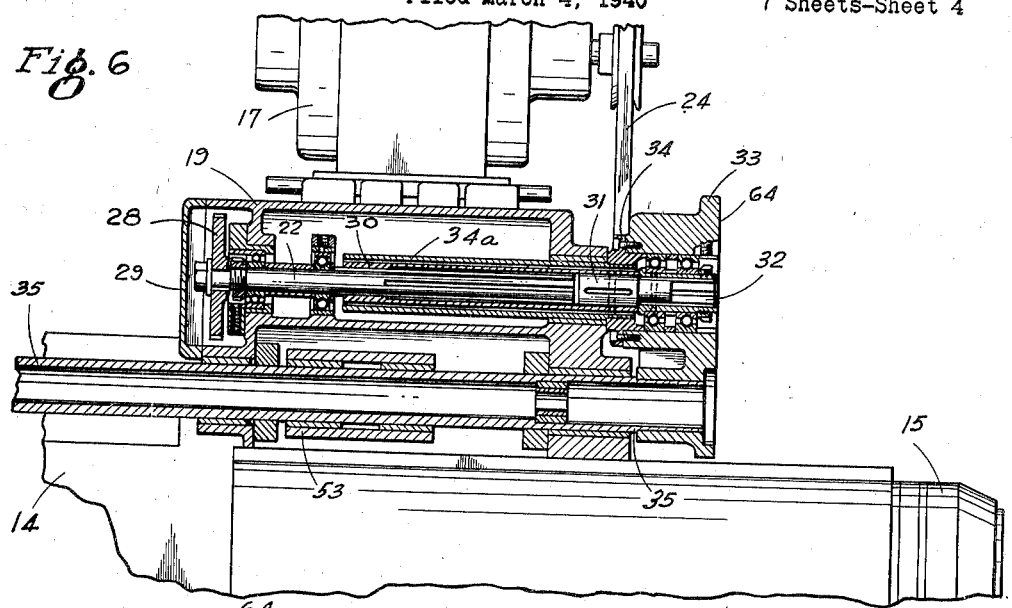
Fig. 6 is a longitudinal vertical sectional view through the attachment illustrated in Fig. 2, the section being taken on a plane indicated by the line 6—6 in Fig. 2.

Referring first to Fig. 1, the screw machine, chosen herein for the purpose of illustration, comprises generally a base 10, a bed 11 mounted thereon, and a housing 12 which supports the tool turret 13 and the driving mechanisms therefor. The opposed end of the machine is provided with a housing 14, which supports the work holding spindle 15 and the drive gearing therefor. The upper face of the housing 14 is constructed for the reception of an auxiliary tool attachment 16 which is driven by an electric motor 17 mounted thereon.

The work holding spindle 15 is driven through gearing from a cam shaft 18 which is organized in the manner customarily employed in machines of this type to effect the reciprocation of the tool turret 13.

The auxiliary tool attachment 16, as will be seen in Fig. 7, comprises a casing 19 formed with bosses in the end walls thereof which are machined to accommodate the reception of antifriction bearings supporting a drive shaft 20, countershaft 21 and spindle 22. The drive shaft 20 is provided with a sheave 23 connected with the motor 17 through an endless belt 24 preferably of the V-type form. Upon the inner end of the drive shaft 20 there is a pinion 25 intermeshed with a spur gear 26 which is keyed upon the countershaft 21. The outer end of the countershaft 21 is provided with a pinion 27 intermeshed with a spur gear 28 keyed upon the spindle 22. The pinion 27 and gear 28 are mounted to accommodate their ready removal in order to facilitate selective gear drive ratios. Access to the change gears 27 and 28 may be obtained by removal of a cover plate 29 bolted to the end wall of the casing 19. The spindle 22 is splined for engagement with a broached tube 30 having an arbor 31 secured in the outer end thereof to provide a driving element between the spindle 22 and a sleeve 32 formed to provide a driving socket for the tools mounted therein. The sleeve 32 is supported in anti-friction bearings mounted in a companion flange 33 affixed to a pilot bearing 34 which in turn is retained by a tubular supporting member 34a mounted in the casing 19.

The assembly disclosed in the foregoing description comprises a power transmission unit adapted to effect the operation of the tools coupled with the socket 32 and supported by various instrumentalities mounted on the companion flange. For example, the high speed drilling attachment, the slotting saw and the collapsible die head which are shown herein exemplify a few tools of the type which may be used with a mechanism of this character.

Figure 15:
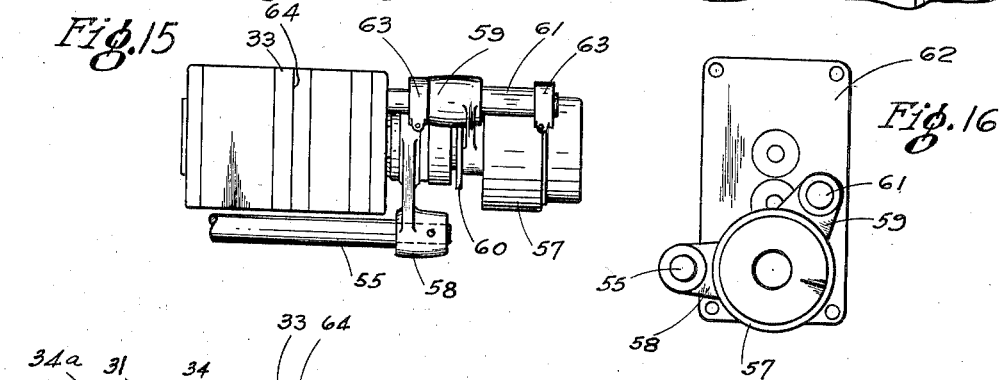
Fig. 15 is a plan view of the tool attachment and die head supporting structure illustrated in Fig. 14.
Figure 16:
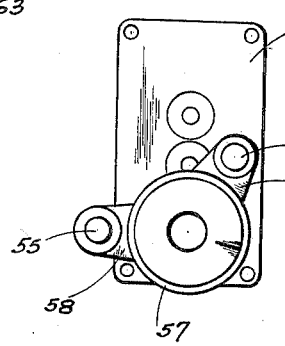
Fig. 16 is an end elevational view of the die head support illustrated in Fig. 15.

The casing 19 is formed with a pair of brackets 36 (Figs. 2 and 3) having journal bearings in the end portions thereof for the reception of a shaft 37. Upon the end of the shaft 37 there is a sprocket 38 having a chain 39 trained thereover and connected with a sprocket 40 keyed upon the cam shaft 18. The chain is constructed with a removable link to accommodate the assembly and ready removal thereof from the sprocket 40. Tensional adjustments of the chain are effected by an idler sprocket 41 mounted on a bell crank 42 fulcrumed on the bracket 36 and coupled with a jack screw 43 retained within a boss formed in a side wall of one of the brackets 36. Upon the shaft 37 adjacent the inner bracket 36 there is a split collar 44 retained in frictional engagement upon the shaft through draw bolts mounted in openings formed in the circumference of the collar. The inner face of the collar is drilled for the reception of a dowel pin 45 pressed in the hub of a cam drum 46 mounted on the shaft 37. The drum 46 is provided with cam plates 48 forming a track or guideway for a roller 49 mounted upon a lever 50 which is fulcrumed, intermediate its ends, upon a pintle supported in the base of the casing 19. The inner bifurcated end of the lever 50, see Figs. 4 and 5, embraces a stud 51 supported in a boss 52 in a sleeve 53 which is slidably mounted upon the tube 35 within the casing 19. The sleeve 53 is formed with a lug machined with a yoke 54 in the free end thereof which spans a push rod 55 slidably mounted in the casing 19. The yoke 54 is disposed between a collar 56 and a spring 61, the spring being held in compressive engagement with the yoke by a second collar 56 mounted upon the rod 55. The cam drum 46 and the linkage coupled therewith is designed to effect the reciprocative movement of certain of the tools coordinated with the transmission unit, for example, the die head 57 (Fig. 15) which may be advanced and retracted during the operation thereof by the push rod 55 and arm 58 mounted upon the end portion thereof.

The die head illustrated herein (Fig. 15) is of the type in which the die chasers may be opened and closed about the work by actuation of a sleeve mounted upon the periphery of the die holder. To accommodate this action the mechanism herein is provided with an arm 59 engageable with the control sleeve 60 and formed for sliding engagement upon a rod 61 rigidly supported in the threading die gear case 62. The yoked end of the arm 59 is disposed between a pair of stop collars 63 which may be longitudinally adjusted upon the rod 61 to effect the actuation of the sleeve 60 coincident the inner and outer limits of the reciprocative movement of the push rod 55.

The cam roller 49 is held in constant engagement with one face of the track cam throughout the operative cycle of the drum by a helical spring 50a which is connected to the outer end of the arm 50 and anchored upon the base of the casing 19.

Figure 14:
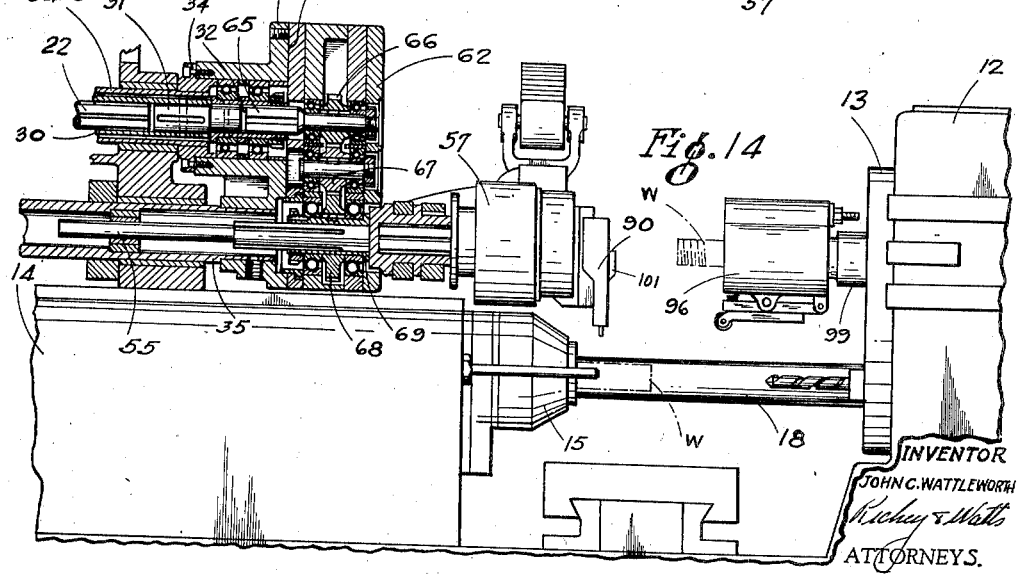
Fig. 14 is a fragmentary portion of the machine illustrated in Figs. 10 and 12 but with the tool turret shown in its retracted position and the tool attachment shown as provided with a collapsible die head.

The various tool driving units mounted upon the face 64 of the companion flange 33 are provided with such gear driving mechanism as may be necessary to produce the proper rotative speed of the tool as required for the type of work or specific operation. Thus, as will be seen in Fig. 14, the threading die assembly comprises a gear case 62 having a stub arbor 65 extending from the rearward face thereof, and received within the broached sleeve or driving socket 32 in the end of the auxiliary tool drive spindle housing. Upon the stub arbor 65 there is a pinion 66 intermeshed with a gear 67 which in turn is intermeshed with a gear 68 keyed upon a sleeve 69 broached for the reception of the splined end of the shank of the die head 57. The rate of rotation of the die head is obtained by a suitable combination of the gears 66, 67 and 68 and the gear ratio as determined by the change gears 27 and 28. The reciprocative movement of the die head is initiated by the cams on the drum 46 which is driven from the machine cam shaft 18 through the chain 39 and hence coordinated for cyclic operation with the turret and the cross slide tools, likewise driven from the cam shaft 18.

The gear casing 70 (Fig. 12) which provides the driving medium for the high speed drilling unit is designed for adfixture upon the face 64 of the companion flange 33. In this unit as in the die head gear casing the structure embodies a splined stub arbor 71 extending from the rearward face of the gear case 70 and adapted for engagement within the broached sleeve or driving socket 32 in the end of the drive spindle 30. Upon the stub arbor there is a gear 72 which is intermeshed with a gear 73 entrained with a pinion 74 keyed to a quill or drill sleeve 75 which extends from the outer face of the gear case 70. The ratio between the gears 72, 73 and 74 and the transmission gearing in the driving attachment is arranged to provide the necessary rotative speed for the size of drill employed in the particular operation to be performed. The drill, as will be seen in Fig. 13, is supported in an outboard bushing 76 pressed into a plate 77 which is retained upon a pair of guide rods 78 backed by compression springs 79 mounted in recessed bosses formed in the casing 70. With this construction the end of the drill is supported while the tool turret is advanced. When the work engages the drill the body thereof is guided while the bushing supporting frame 77 is forced inwardly against the effort of the compression springs 79.

The gear drive mechanism for the slotting saw (Fig. 10) casing comprises a housing 80 having a splined stub arbor 81 extending from the rearward face thereof and adapted for engagement with the socket 32. Upon the outer end of the stub arbor 80 there is a beveled gear 82 intermeshed with a beveled gear 83 keyed to a spindle 84 which is provided with a key for driving the slotting saw 85. The lower portion of the housing 80 is bored for the reception of a pilot bearing 86 which extends into a counterbore 87 in the face of the companion flange 33, to assure the alignment of the housing 80 therewith.

The auxiliary tools mounted on the transmission unit 19 are disposed superjacent the work holding spindle 15 and in coaxial alignment with the station in the tool turret which is second in order of indexed rotation from the turret opening which supports the tool in operative engagement with the work retained by the spindle 15. The main body of the transfer mechanism (Fig. 11) is mounted in the tool station or opening in the turret head adjacent the station containing the tool which performs the last machine operation on the workpiece. The office of the transfer mechanism is to facilitate machine operations upon the inner end of the workpiece, that is the end chucked in spindle 15 and opposite that presented to the tools in the turret. To this end the transfer device embodies a collet adapted to loosely engage and steady the workpiece during the period of operation of the cut-off tool 90, a tightening mechanism to close the collet upon the work during the following index period of the turret and a trip mechanism for ejecting the workpiece after the machining operation is performed thereon by the auxiliary tools mounted above the spindle 15.

As is customary in single spindle screw machines the tool turret is arranged so that the tool in the lowermost turret opening will be in co-axial alignment with the work holding spindle during the machining operation upon the workpiece. In the screw machine illustrated herein the cut-off tool 90 is mounted on an independent slide above the spindle and is organized for reciprocative movement in timed relation with the tool turret in the usual manner so that the cut-off operation will not be completed until the turret tool in the last operative station V is retracted.

As contemplated herein the cut-off tool is timed in relation to the index cycle of the turret so that the workpiece will not be severed from the stock within the spindle 15 until the last operative tool (mounted in station V in the turret) has been retracted and the turret indexed (to station VI) in aligned relation with the work. As the turret advances the collet is brought into telescopic engagement with the work, the spring tension in the collet being designed to support the workpiece after it is severed from the bar stock.

In detail the transfer mechanism (Fig. 11) comprises a collet holder 91 having a recess 92 in the forward face thereof adapted to receive the spring collet 93, preferably locked therein by the set screw 94. The collet holder is formed with a shank 95 mounted in one of the recesses in the turret provided normally for the retention of the turret end working tools. Surrounding the body of the collet holder 91 there is a sleeve 96 having the forward end thereof taper bored in complemental configuration with the conical end of the collet 93. Within the inner end of the sleeve 96 there is a ring 97 seated in a counterbore in the sleeve and retained therein by a split ring 98. The inner end of the holder is threaded to receive a collar 99 arranged for abutting engagement with the face of the turret to accommodate lineal adjustment of the holder relative thereto. The holder 91 is bored for the reception of compression springs 100 having plungers inserted therein which engage the ring 97 and normally urge the sleeve 96 rearwardly to effect the engagement of the tapered end thereof with the conical end of the collet.

The holder for the cut-off tool 90 is provided with a cam plate 101 mounted for vertical adjustment thereon and adapted for engagement with a roller mounted upon a longitudinally adjustable plate 102 secured to a lever 103 fulcrumed upon a boss formed on the sleeve 96. Upon the inner end of the lever 103 there is a plunger 104 guided through an opening in the sleeve for engagement in a slot 106 machined in the body of the collet holder 91. The plunger 104 is normally urged into seated engagement within the slot 106 by a spring 105 disposed between the sleeve and the outer end of the lever 103.

The collet holder shank 95 is bored throughout its length for the reception of an ejector rod 107 and a compression spring 108 disposed intermediate the inner end of the shank. The ejector rod is formed with a longitudinal groove 109 having shouldered end portions therein adapted for engagement with a stop pin 110 mounted in the collet tool holder shank 95.

The lower face of the sleeve 96 is formed with a longitudinal rib (Fig. 9) which is machined for the reception of a plunger 111 and a dovetailed cam block 112. The outer end of the plunger is drilled and tapped to receive a stud 113 having a jam nut thereon to facilitate the securement of the stud in its adjusted position. The plunger is constructed with a transaxial groove in the body thereof which is provided for the reception of the axle of a spool 114 movable longitudinally through an opening 115 formed in the inner wall of the sleeve 96. The outer ends or roller portions of the spool 114 are engageable with a land milled in the face of the holder 96 and with the inclined cam tracks 116 formed in the block 112. Intermediate the forward end of the plunger 111 and a screw plug in the end of the sleeve there is a spring 117 normally urging the plunger rearwardly so that the spool mounted in the groove therein will, in turn, be urged in wedged engagement between the holder 95 and the inclined cam tracks 116 in the block 112 and thus retain the sleeve in clamped relation with the holder. Adjacent the plunger 111 there is a push rod 118 extended from the forward face in the sleeve and retained therein by a pin arranged for abutting engagement with the shoulders formed by the necked portion therein. The inner end of the push rod 118 is engaged with resilient buffer block 119 provided to cushion the impact of the rod with the abutment coordinated therewith during the reciprocation of the turret. Upon the forward face of the housing 14 adjacent the work holding spindle 15 there is a boss 120 drilled and tapped for the reception of a stop pin 121, which is disposed to engage the push rod 118 when the tool turret is indexed to its next position, or as shown in Fig. 8, from station number VI to station number V.

The housing 12 is formed with a rib 122 which is machined for the reception of a cap screw 123 upon which there is fulcrumed a pawl 124 adapted to fall by gravity upon a stop pin 125 mounted in the face of the housing 12, adjacent the periphery of the turret 13 as illustrated in Fig. 9. The free end of the pawl 124 is disposed for engagement by the outer end of the stud 113 during the index movement of the turret, that is from station number VI to station number IV, as shown in Fig. 9.

In operation after the end working tools are retracted from the work the turret is indexed to the position where the collet 93 is in co-axial alignment with the spindle 15. In adjusting the feed for the cut-off tool 90 the cam is arranged so that the turret, in its return cycle, will be in a position where the collet 93 will be moved to telescopic engagement with the work before the workpiece W is severed from the stock chucked in the driving spindle of the machine. Slightly before the workpiece W is separated from the stock in the spindle 15 the cam plate 101, mounted on the descending cut-off tool, will engage the roller carried by the lever 103 and elevate the plunger 104 from the slot 106 in the collet holder 91, thus causing the release of the compression springs 100 and the consequent retraction of the sleeve 96. As the springs 100 urge the sleeve inwardly over the tapered end portion of the collet the spring fingers thereof will be closed inwardly upon the workpiece W in clamping relation therewith. As the work enters the collet 93 the ejector rod 107 will be forced inwardly against the spring 108 and thus effect the compression therein. Since the sleeve actuating springs 100 outweigh the spring 108 the ejector will remain in its retracted position until the sleeve is readjusted to the collet releasing position. After the cut-off tool 90 has severed the workpiece W from the stock in the spindle the turret 13 is retracted and indexed (from the station VI) to the position where station V is in coaxial alignment with the spindle. During the forward movement of the turret 13 the push rod 118 is brought into abutting engagement with the stop pin 121 thus forcing the sleeve 96 inwardly so that the tapered bore therein will impinge the conical end of the collet 93 and firmly close the collet upon the workpiece W. With the work thus held the turret will next be retracted and rotatively indexed to the position indicated as station IV in Fig. 9 where the collet is aligned with the saw shown in Fig. 8. During the indexing period the end portion of the stud 113 will engage the lower face of the pawl 124 and cause the elevation thereof, but as the turret advances outwardly the pawl will fall back upon the pin 125 for abutting engagement with the end of the stud upon the succeeding retractive movement of the turret 13. As the turret advances during this portion of the operative cycle of the machine the workpiece W will be brought into working engagement with the tools carried by the auxiliary tool attachment where the machining operation is performed upon the end of the work. After the collet is closed and during the machining operation on the end of the work the collet is retained in locked engagement by the wedged action of the spool 114 with the cam 116. After the machining operation has been completed by the auxiliary tool unit the turret 13 is retracted, whereupon the end of stud 113 will engage the face of the pawl 124, thus causing the translation of the plunger 111 and consequent movement of the spool to a position where its wedged relation with the cams 116 is released. Continued movement of the turret will bring the shouldered head 126 of the plunger 111 into engagement with the rearward face of the sleeve and cause the actuation thereof in a forwardly direction, thereby causing the release of the spring collet 93 and the reentrant engagement of the plunger 104. With the collet jaws thus open the push rod 107, under the influence of the pre-loaded spring 108, will effect the ejectment of the workpiece W from the collet before the turret is indexed to the station in which the transfer mechanism is reloaded.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a screw machine embodying a cut-off tool, a turret and turret tools for machining one end of a workpiece, mechanism for machining the opposed end of said workpiece comprising, an auxiliary tool attachment, a tool mounted therein, a collet holder supported in said turret, a collet in said holder mounted for telescopic engagement with said workpiece, a sleeve slidably mounted on said collet, springs in said holder normally urging the collet in gripping engagement with the work, means in said sleeve for restraining the action of said springs and means on said sleeve coacting with the first named means and said cut-off tool to release said springs contemporaneous the completion of the cut by the cut-off tool and prior the engagement of the workpiece with the tool in said auxiliary tool attachment.

2. In a single spindle screw machine embodying a housing, a cut-off tool and an indexible tool turret, mechanism for performing an automatic machining operation upon the end of a workpiece severed by said cut-off tool comprising, a tool driving unit mounted on said housing, a tool therein disposed for alignment with one of the tool stations in the turret, a collet supported in another tool station in said tool turret, means associated with said collet and said housing to open the collet to receive the workpiece after one indexing cycle of the turret and prior to the operation of the cut-off tool and means associated with said collet and the housing for closing the collet upon the work subsequent the separation of the workpiece by the cut-off tool and prior the indexing of the turret to the station aligned with the tool in said driving unit.

3. A screw machine embodying a spindle housing, a cut-off tool and indexible turret tools for machining one end of a workpiece, mechanism for machining the opposed ends of said workpiece comprising an auxiliary tool attachment, a tool mounted therein, a collet mounted in said turret for telescopic engagement with said workpiece, a sleeve slidably mounted on the collet, a push rod slidably mounted in said sleeve, a pin mounted on said spindle housing and disposed for engagement with said push rod upon the indexed and reciprocated movement of the turret following the operation of the cut-off tool and prior to the operation of the tool in said auxiliary attachment.

4. In a single spindle automatic screw machine embodying a cut-off tool, a reciprocable turret and turret tools, mechanism for machining the end of the workpiece opposite the end machined by the turret tools comprising, a rotatively driven tool mounted on the machine opposite the turret and in aligned relation with one of the tool stations therein, a workpiece holder mounted in said turret, mechanism for gripping the work in said holder, mechanism for ejecting the work from said holder, and stops mounted on said machine for operating said gripping and ejecting mechanisms during the reciprocation of said turret.

5. A workpiece transfer mechanism for a lathe turret of the reciprocating type comprising, a supporting member mounted in said turret, a spring collet mounted thereon, a sliding sleeve on said collet for opening and closing the collet on the work, a latch on said sleeve for the retention thereof in its collet closing position during a portion of the reciprocative cycle of the turret and cam actuated means interposed between said sleeve and supporting member to interlock said collet and sleeve upon the reciprocation of said turret.

6. A workpiece transfer mechanism for a single spindle screw machine comprising, a spring collet mounted in one of the tool stations in the turret of said screw machine, a collet operating sleeve mounted thereon, compression springs intermediate said collet and said sleeve normally urging the sleeve into collet closing position, a latch for holding said sleeve in collet open position, a spring pressed plunger for ejecting the workpiece from the collet when said sleeve is operated to collet opening position and means on said turret for actuating said sleeve.

7. In a screw machine embodying a housing, a reciprocable cut-off tool and an indexible reciprocating tool turret, a workpiece transfer mechanism comprising, a spring collet mounted in one of the tool stations in the turret of said screw machine, a collet operating sleeve mounted thereon, compression springs intermediate said collet and said sleeve normally urging the sleeve into collet closing position, a latch for holding said sleeve in collet open position, a spring pressed plunger for ejecting the workpiece from the collet when said sleeve is operated to collet opening position, locking mechanism mounted in said sleeve, means on said housing for actuating said shifter during the reciprocation of said turret and means on said cut-off tool for tripping said latch during the reciprocation of said cut-off tool.

8. In combination with a screw machine embodying a cut-off tool and a reciprocable turret having cutting tools therein, an auxiliary tool for machining the end of a workpiece opposite the end machined by said turret cutting tools, said auxiliary tool comprising, a gear case mounted above said cut-off tool, a gear train therein, a reciprocative rod in said case, a shaft in said case rotatively driven through said gear train, a tool supported by said rod and rotatively driven from said shaft, said tool being arranged in aligned relation with one of the tool stations in said turret and means in said gear case to effect the reciprocation of said rod in timed relation with the reciprocation of said turret.

9. In combination with a screw machine embodying a cut-off tool and a reciprocable turret having cutting tools therein, an auxiliary tool for machining the end of a workpiece opposite the end machined by said turret cutting tools, said auxiliary tool comprising, a gear case mounted above said cut-off tool, a gear train therein, a shaft rotatively driven by the gears in said gear train, a cam on said gear case driven from the actuating medium for said turret, linkage connected to said cam for reciprocating a rod in the gear case, a tool on said rod arranged in aligned relation with one of the stations in the turret above said cut-off tool, and a second gear train on said gear case intergearing said shaft with said tool.

10. An auxiliary tool for a single spindle screw machine to machine the end of a workpiece opposite the end machined by the turret of said machine comprising, a gear case, a motor operatively connected therewith, a gear train in said case, a shaft rotatively driven from said gears, a cam mounted on said gear case driven in timed relation with the driving medium for the turret, a rocker arm connected with said cam, a push rod reciprocated by said rocker arm, a tool carried by said push rod and rotatively driven from said shaft, said tool being mounted in aligned relation with one of the tool sockets in said turret and a guide mounted on said case for supporting said tool during the reciprocation thereof.

11. An auxiliary tool for a single spindle screw machine to machine the end of a workpiece opposite the end machined by the turret of said machine comprising, a gear case, a motor operatively connected therewith, a gear train in said case, a shaft rotatively driven from said gears, a cam mounted on said gear case driven in timed relation with the driving medium for the turret, a rocker arm connected with said cam, a push rod reciprocated by said rocker arm, a threading die head carried by said push rod and rotatively driven from said shaft, said tool being mounted in aligned relation with one of the tool sockets in said turret, a guide rod affixed to said case and stop collars on said guide rod for opening and closing the chasers in said die head during the reciprocation thereof.

12. In combination with a screw machine embodying a cut-off tool and a reciprocable turret having cutting tools therein, an auxiliary tool for machining the end of a workpiece opposite the end machined by said turret cutting tools, said auxiliary tool comprising, a gear case mounted above said cut-off tool, a gear train therein, a shaft in said case rotatively driven through said gear train, a second gear train on said gear case intergeared with said shaft, a tool driven from said second gear train, said tool being arranged in aligned relation with one of the stations in said turret superjacent said cut-off tool.

13. An auxiliary tool for a single spindle screw machine to machine the end of a workpiece opposite the end machined by the turret of said machine comprising, a gear case, a motor operatively connected therewith, a gear train in said case, a shaft rotatively driven from said gears, a cam mounted on said gear case driven in timed relation with the driving medium for the turret, a rocker arm connected with said cam, a push rod reciprocated by said rocker arm, a drill carried by said push rod and rotatively driven from said shaft, said tool being mounted in aligned relation with one of the tool sockets in said turret, yieldable guide rods mounted in said case, a tie bar mounted in said guide rods and a bushing in said tie bar for supporting said drill.

14. A driving mechanism for an auxiliary tool drive unit for a single spindle screw machine comprising a gear case, a gear train therein, a motor operatively connected therewith, a shaft driven through said gear train, means for coupling said tool drive unit with said shaft, and means to effect the aligned relation of said shaft in said gear case with the driven members in said tool drive unit.

15. A driving mechanism for an auxiliary tool drive unit for a single spindle screw machine comprising, a gear case, change speed gearing therein, a motor connected therewith, a drive shaft connected with said gearing, a coupling intermediate said drive shaft and said tool drive unit and a pilot intermediate said gear case and said tool drive unit.

16. In a screw machine embodying a spindle housing, a work holding spindle therein and a reciprocative, indexible tool turret, mechanism for machining both ends of a workpiece comprising a plurality of tools in said turret engageable in turn with the work in said spindle, a chuck in one of the stations in said turret, mechanism for opening and closing said chuck, means for actuating said mechanism to close said chuck upon a workpiece machined in the spindle, a rotatively driven cutter mounted on said housing in aligned relation with the chuck during one of the indexed positions of the turret and means for actuating said mechanism to open said chuck subsequent engagement of said cutter with said workpiece.

17. In a screw machine embodying a work holding spindle, a cross slide and an indexible tool turret, mechanism for machining both ends of a workpiece comprising a tool in said turret, a chuck in said turret engageable with said workpiece, closure mechanism in said chuck, a rotatively driven cutter mounted on the machine in aligned relation with one of the indexed positions of said chuck and means on said cross slide for operating said closure mechanism prior the engagement of said cutter with the workpiece in said chuck.

18. In a screw machine embodying a spindle housing, a work holding spindle therein and a reciprocable, indexible tool turret, mechanism for machining both ends of a workpiece comprising a tool in one of the stations in said turret, a collet in another station in said turret, means on said collet for securing a workpiece therein, a power transmission gear train mounted on said housing superjacent said spindle, a cutter driven thereby, means for advancing said cutter into engagement with the workpiece in said collet when the turret is indexed to the position in which the collet is in aligned relation therewith, and means for ejecting the workpiece from said collet.

JOHN C. WATTLEWORTH.